CIGARETTE PACKAGE CONSTRUCTION OR THE LIKE

Original Filed March 16, 1964 2 Sheets-Sheet 1

INVENTORS
WILLIAM C. WHITAKER
JOSEPH Y. THOMAS
BY Glenn, Palmer & Matthews
THEIR ATTORNEYS

CIGARETTE PACKAGE CONSTRUCTION OR THE LIKE

Original Filed March 16, 1964 2 Sheets-Sheet 2

INVENTORS
WILLIAM C. WHITAKER
JOSEPH Y. THOMAS
BY Glenn, Palmer & Matthews
THEIR ATTORNEYS United States Patent Office Re. 26,712
Reissued Nov. 18, 1969

26,712
CIGARETTE PACKAGE CONSTRUCTION OR THE LIKE

William C. Whitaker, Chesterfield County, and Joseph Y. Thomas, Henrico County, Va., assignors to Reynolds Metals Company, Richmond, Va., a corporation of Delaware Original No. 3,270,945, dated Sept. 6, 1966, Ser. No. 351,997, Mar. 16, 1964. Application for reissue Aug. 30, 1968, Ser. No. 760,390
Int. Cl. B65d *17/00, 5/54, 5/70*
U.S. Cl. 229—51 25 Claims

Matter enclosed in heavy brackets [ ] appears in the original patent but forms no part of this reissue specification; matter printed in italics indicates the additions made by reissue.

*ABSTRACT OF THE DISCLOSURE*

*This application discloses an improved container having improved opening means and a blank from which the same can be formed. On its open end, the container has side flaps with one end flap extending therefrom so formed that portions of the side flaps are in overlapping relation with each other while other portions are in abutting relation with each other.*

This invention relates to an improved container having improved opening means therefor.

It is well known that the conventional cigarette package construction normally comprises a metallic foil liner disposed around the cigarettes and received in a paper cup-like member to hold the package construction together. Thereafter, a cellophane overwrap or the like is disposed around the entire package construction so that a pull string can be provided for opening the cellophane overwrap to provide access means for opening the overlapping portions of the liner adjacent a revenue-like stamp extending across the liner at the open end of the paper cup-like member.

However, according to the teachings of this invention, an improved package construction is provided for cigarettes or the like wherein the conventional paper cup-like member, cellophane overwrap and revenue-like stamp can be completely eliminated as the so-called metallic foil liner forms the entire surrounding structure for the cigarettes or the like and has unique means for sealing the freshness of the cigarettes therein as well as readily permitting the ultimate consumer to open the same in a simple and effective manner.

Accordingly, it is an object of this invention to provide an improved container having one or more of the novel features of this invention as set forth above or hereinafter shown or described.

Other objects, uses and advantages of this invention are apparent from a reading of this description which proceeds with reference to the accompanying drawings forming a part thereof and wherein.

Figure 1:
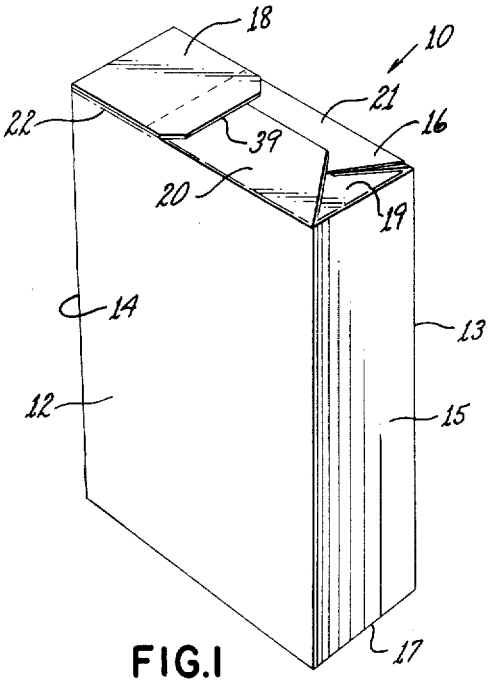
FIGURE 1 is a perspective view of the improved container of this invention in its closed position.

While the various features of this invention are hereinafter described and illustrated as being particularly adaptable to provide a single wrap for cigarettes or the like, it is to be understood that the various features of this invention can be utilized singly or in any combination thereof to provide an improved container and opening means for other products as desired.

Therefore, this invention is not to be limited to only the embodiments illustrated in the drawings, because the drawings are merely utilized to illustrate one of the wide variety of uses of this invention.

Figure 8:
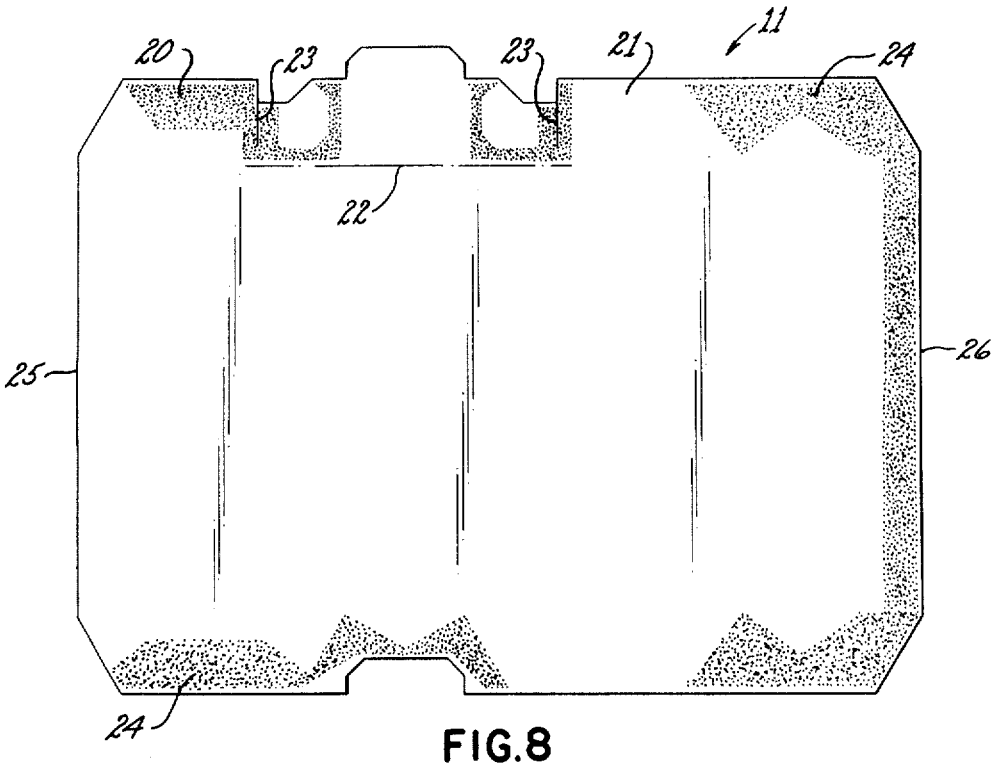
FIGURE 8 is a plan view of the improved blank of this invention for forming the container of FIGURE 1.

Referring now to FIGURE 1, the improved container of this invention is generally indicated by the reference numeral 10 and is formed from a single sheet of material shaped in the general configuration illustrated in FIGURE 8 and generally indicated by the reference numeral 11.

The sheet of material 11 can comprise any desired material. However, the embodiment illustrated in the drawings comprises a sheet of metallic foil, such as aluminum-containing metallic foil or the like, laminated to a sheet of reinforcing paper material whereby the metallic foil side of the sheet 11 forms the exterior surface of the container 10 and provides a substantial moisture barrier surrounding the contents of the container 10 in a manner hereinafter described.

The sheet of material 11 is folded either manually or automatically in a manner hereinafter described to define the substantially rectangular container 10 in such a manner that the same provides a pair of opposed side walls 12 and 13 and a pair of opposed end walls 14 and 15 respectively interconnected together at the corners of the container 10 and defining a tubular structure having opposed open ends 16 and 17.

The container 10 has a pair of end flaps 18 and 19 and a pair of side flaps 20 and 21 respectively extending from the open end 16 thereof and being utilized in a manner hereinafter described to close the open end 16 of the container 10.

In addition, the lower portion of the blank 11 illustrated in FIGURE 8 is adapted to define a pair of end flaps and a pair of side flaps extending from the opened end 17 of the container 10 to close the open end 17 thereof in a conventional manner whereby the flaps of the open end 17 of the container 10 will not be specifically described although the same will be apparent from folding the blank 11 into the configuration illustrated in FIGURE 1.

While the blank 11 is not creased or scored in the flat form illustrated in FIGURE 8, the same is adapted to be folded into the configuration illustrated in FIGURE 1 by suitable folding apparatus or the like.

However, a prescore or crease 22 is formed in the blank 11 in the manner illustrated in FIGURE 8 to be disposed at the open end 16 of the container 10 adjacent the end flap 18 for a purpose hereinafter described.

The blank 11 has a pair of slits 23 formed therein and extending inwardly the free edges of the side flaps 20 and 21 toward the crease 22 in the manner illustrated in FIGURE 8 for a purpose hereinafter described.

In addition, the blank 11 is adapted to have glue or other suitable, adhesive applied thereto in the pattern illustrated in FIGURE 8 to permit the blank 11 to be folded into the sealed container 10 in a manner hereinafter described, the adhesive being indicated by the reference numeral 24. If desired, the adhesive 24 can be a heat sealable adhesive which can be activated by suitable heating means during the folding operation of the container 10.

When it is desired to fold the blank 11 into the container construction 10, the blank 11 is folded into tubular form by having the end edge 25 of the blank 11 disposed over the end edge 26 thereof and secured together by the adhesive 24 whereby cigarettes 27 or the like can be inserted into the tubular form and the opposed open ends 16 and 17 thereof can be subsequently closed, the end 17 being closed in a conventional manner while the end 16 is closed in a manner now to be described.

Figure 3:
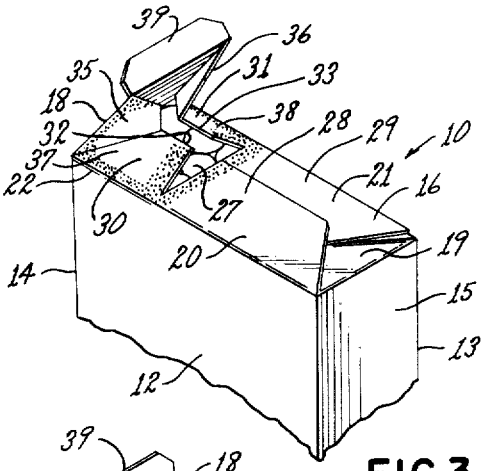

First, the end flap 19 of the container 10 is folded over the opened end 16 thereof whereby parts of the side flaps 20 and 21 are folded inwardly from the end wall 15 in a conventional manner whereby the side flaps 20 and 21 are adapted to be folded over the open end 16 over the folded end flap 19 in the manner illustrated in FIGURE 3 whereby the portion 28 of the side flap 20 is adapted to be disposed over the portion 29 of the side flap 21 and be secured thereto by the adhesive 24, the adhesive 24 also securing the folded under parts of the flaps 20 and 21 to the end of flap 19 in the manner provided by the adhesive pattern 24 in FIGURE 8.

Figure 6:
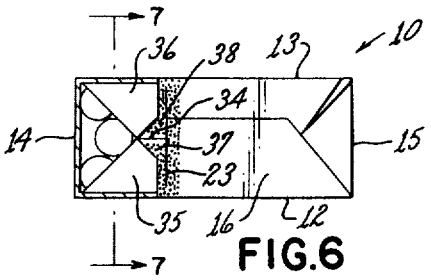
FIGURE 6 is a top view of the container illustrated in FIGURE 1 with the left end flap thereof cut away, FIGURE 6 being taken on line 6—6 of FIGURE 7.
Figure 7:
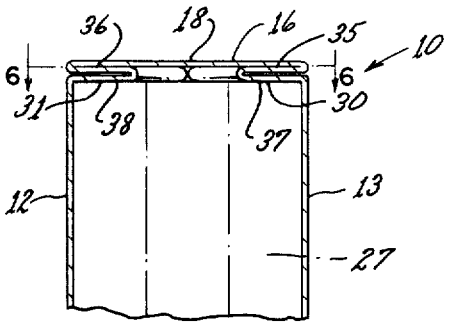
FIGURE 7 is an enlarged, fragmentary, cross-sectional view taken on line 7—7 of FIGURE 6.

It can be seen that the slits 23 in the side flaps 20 and 21 divide the portions 28 and 29 thereof from portions 30 and 31 of the side flaps 20 and 21 so that the free edges 32 and 33 of the portions 30 and 31 will be disposed in abutting relation adjacent the slits 23 in the manner illustrated in FIGURE 6 to define a central seam or slit 34.

When the side flaps 20 and 21 are folded inwardly over the open end 16 of the container 10, it can be seen that parts 35 and 36 of the portions 30 and 31 of the side flaps 20 and 21 will be folded downwardly on the remaining parts 37 and 38 thereof in the manner illustrated in FIGURE 6 and be secured thereto by the adhesive pattern 24 on the blank 11.

The end flap 18 is also folded over the open end 16 over the portions 30 and 31 of the side flaps 20 and 21 in the manner illustrated in FIGURE 1 whereby the same will be secured to the portions 30 and 31 of the side flaps 20 and 21 by the adhesive 24 in the manner illustrated in FIGURE 6 as well as to the overlapping portions 28 and 29 of the side flaps 20 and 21 in the manner illustrated in FIGURE 6 so that the end flap 18 completely seals closed the slits 23 and 34 as well as seals closed the open end 16 of the container 10.

Therefore, it can be seen that the blank 11 of this invention can be effectively folded around the cigarettes 27 to provide a completely sealed closed construction for packaging the same without requiring the conventional paper cup and cellophane overwrap of a conventional cigarette package construction.

Figure 2:
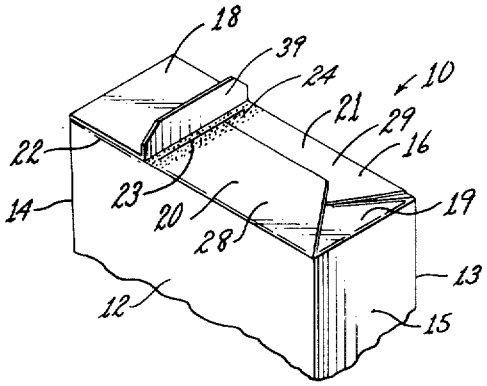
FIGURES 2–5 are respectively fragmentary perspective views illustrating the various steps in the method of opening the container of FIGURE 1.

When the ultimate consumer desires to initially open the container 10 of this invention, the ultimate consumer inserts a fingernail under the free edge 39 of the end flap 18, the free edge 39 extending beyond the adhesive pattern 24 on the overlapping portions 28 and 29 of the side flaps 20 and 21 to permit the ultimate consumer to lift up on the free edge 39 and peel the same backwardly toward the end wall 14 in the manner illustrated in FIGURE 2.

Figure 4:
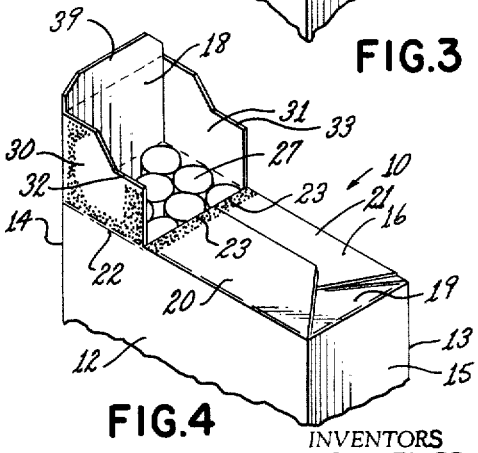

Further upward and backward movement of the end flap 18 in the manner illustrated in FIGURE 3 causes the end flap 18 to separate from the side flaps 20 and 21 to permit the portions 30 and 31 of the side flaps 20 and 21 to be folded outwardly into position illustrated in FIGURE 4 by tearing through the side flaps 20 and 21 at the slits 23 to the crease 22 previously described.

In this manner, the container 10 can be completely opened so that the ultimate consumer can dispense the cigarettes 27 as desired out through the open end 16 thereof.

Thereafter, the ultimate consumer can fold back the end flap 18 in a reverse sequence in FIGURES 2–4 to close the container 10 and provide a neat package construction.

Figure 5:
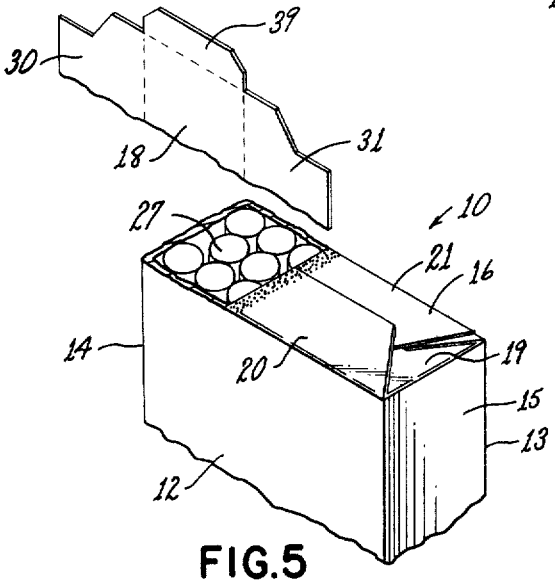

However, as is the usual case, the ultimate consumer desires to tear off the open portions of the container 10 in the manner illustrated in FIGURE 5 whereby the precrease 22 in the blank 11 adjacent the portions 30 and 31 of the side flaps 20 and 21 and end flap 18 readily permits the ultimate consumer to tear off the end flap 18 and portions 30 and 31 of the side flaps 20 and 21 in the manner illustrated in FIGURE 5 without requiring the use of the conventional paper cup as a back up means for the tearing operation in a conventional cigarette package construction.

Thus, it can be seen that the blank 11 of this invention is so constructed and arranged that the same readily permits the edges 32 and 33 of the parts 30 and 31 of the side flaps 20 and 21 to be disposed in abutting relation in the manner illustrated in FIGURE 6 so that when the end flap 18 is folded over the same the end flap 18 can completely seal closed all slits 23 and 34 in the side flaps 20 and 21 so that product freshness can be retained.

Accordingly, it can be seen that not only does this invention provide an improved container having many novel features, but also this invention provides an improved opening means for such a container or the like.

While the form of the invention now preferred has been disclosed as required by the statutes, other forms may be used, all coming within the scope of the claims which follow.

What is claimed is:

1. A container having an open end, said open end having a pair of opposed side flaps and an end flap extending therefrom, said side flaps each being formed into two portions by a slit extending inwardly from the free edge thereof toward said open end, said side flaps being folded over said open end with said one portion of one of said side flaps disposed in overlapping relation with said one portion of the other side flap and the other portion of said one side flap disposed in abutting relation with said other portion of said other side flap to close said open end, said end flap being folded over said other portions of said side flaps and extending over part of said one portions of said side flaps to completely cover said slits in said side flaps.

2. A container as set forth in claim 1 wherein said slits are in aligned relation when said side flaps are folded over said open end.

3. A container as set forth in claim 1 wherein said overlapping portions of said side flaps are secured together.

4. A container as set forth in claim 1 wherein said end flap is secured to said overlapping portions of said side flaps.

5. A container having an open end, said open end having a pair of opposed side flaps and a pair of opposed end flaps extending therefrom and being joined together at their junctures with each other, said side flaps each being formed into two portions by a slit extending inwardly from the free edge thereof toward said open end, said side flaps being folded over said open end with said one portion of one of said side flaps disposed in overlapping relation with said one portion of the other side flap and the other portion of said one side flap disposed in abutting relation with said other portion of said other side flap to close said open end, said other portions of said side flaps having parts thereof folded on top of the remaining parts thereof, one of said end flaps being folded over said other portions of said side flaps and extending over part of said one portions of said side flaps to completely cover said slits in said side flaps.

6. A container as set forth in claim 5 wherein said other end flap is folded over said open end beneath said one portions of said side flaps.

7. A container as set forth in claim 5 wherein said slits are in aligned relation when said side flaps are folded over said open end.

8. A container as set forth in claim 5 wherein said overlapping portions of said side flaps are secured together.

9. A container as set forth in claim 5 wherein said first-named parts of said other portions of said side flaps are secured to said remaining parts thereof.

10. A container as set forth in claim 5 wherein said one end flap is secured to said other portions of said side flaps adjacent said slits.

11. A container as set forth in claim 5 wherein said one end flap is secured to said overlapping portions of said side flaps.

12. A substantially rectangular container formed from a single sheet of material having opposed ends thereof disposed in overlapping relation to define a tubular structure defining opposed side walls and opposed end walls of said container with a pair of opposed side flaps and a pair of opposed end flaps respectively extending from opposed open ends of said container, each set of flaps being joined together at their junctures with each other, one pair of said side flaps each being formed into two portions by a slit extending inwardly from the free edge thereof toward the respective one open end, said one pair of side flaps being folded over said one open end with said one portion of one of said side flaps disposed in overlapping relation with said one portion of the other side flap and the other portions of said one side flap disposed in abutting relation with said other portion of said other side flap to close said one open end, said other portions of said one pair of side flaps having parts thereof folded on top of the remaining parts thereof, one of said end flaps at said one open end being folded over said other portions of said one pair of side flaps and extending over part of said one portions thereof to completely cover said slits in said one pair of side flaps.

13. A container as set forth in claim 12 wherein said sheet of material is creased at said one open end of said container adjacent said one end flap and said other portions of said one pair of side flaps to facilitate removal of the same.

14. A container as set forth in claim 12 wherein the other end flap at said one open end is folded over said one open end beneath said overlapping portions of said one pair of side flaps.

15. A container as set forth in claim 12 wherein said flaps at said other open end of said container close the same.

16. A container having an open end, said open end having a pair of opposed side flaps and end flaps extending therefrom, said side flaps each being formed into two portions by a slit extending inwardly from the free edge thereof towards said open end, said side flaps being folded over said open end with said one portion thereof in overlapping relation and the other portions thereof in abutting relation to close said open end, said end flap being folded over said other portions of said side flaps and extending over part of said one portion of said side flaps to completely cover said slits in said side flaps, said end flap being secured to said overlapping portion of said side flaps, said end flap having a free end grasping portion extending beyond the portion thereof that is secured to said overlapping portions of said side flaps.

17. A container having an open end, said open end having a pair of opposed side flaps and a pair of opposed end flaps extending therefrom and being secured together at their junctures with each other, said side flaps each being formed into two portions by a slit extending inwardly from the free edge thereof towards said open end, said side flaps being folded over said open end with said one portions thereof in overlapping relation and the other portions thereof in abutting relation to close said open end, said other portions of said side flaps having parts thereof folded on top of the remaining parts thereof, one of said end flaps being folded over said other portions of said side flaps and extending over part of said one portion of said side flaps to completely cover said slits in said side flaps, said one end flap being secured to said overlapping portion of said side flaps, said one end flap having a free end grasping portion extending beyond the portion thereof that is secured to said overlapping portions of said side flaps.

*18. A flat blank adapted to be folded and sealed to form a container having an open end, said open end having a pair of opposed side flaps and an end flap extending therefrom, said side flaps each being formed into two portions by a slit extending inwardly from the free edge thereof toward said open end, said side flaps being folded over said open end with said one portion of one of said side flaps disposed in overlapping relation with said one portion of the other side flap and the other portion of said one side flap disposed in abutting relation with said other portion of said other side flap to close said open end, said end flap being folded over said other portions of said side flaps and extending over part of said one portions of said side flaps to completely cover said slits in said side flaps.*

*19. The blank of claim 18 wherein said slits are precut to define said other portions of said side flaps with said end flap disposed contiguously therebetween.*

*20. The blank of claim 18 which further comprises an aluminum foil layer laminated to a paper layer.*

*21. The blank of claim 18 wherein a heat sealable adhesive is disposed on said side flaps immediately adjacent and on both sides of said slits.*

*22. The blank of claim 18 wherein the inner limits of said end flap and of said other portions of said side flaps are defined by a linear crease.*

*23. The blank of claim 18 wherein said slits are parallel.*

*24. The blank of claim 19 wherein said other portions of said side flaps are precut so that at said slits said one portion of said side flaps project beyond the free edge thereof.*

*25. The blank of claim 20 wherein said end flap is precut so that its free edge projects beyond said precut free edges of said other portions of said side flaps.*

References Cited

The following references, cited by the Examiner, are of record in the patented file of this patent or the original patent.

UNITED STATES PATENTS

| | | | |
|---|---|---|---|
| 3,237,843 | 3/1966 | Reed et al. | 229—87 XR |
| 2,205,068 | 6/1940 | Potter | 229—17 |
| 2,789,747 | 4/1957 | Graybill | 229—17 |
| 2,928,579 | 3/1960 | Graybill | 229—17 |
| 3,095,135 | 6/1963 | Hennessey | 229—17 |
| 3,123,275 | 3/1964 | Bunger | 229—17 |

FOREIGN PATENTS

| | | |
|---|---|---|
| 285,326 | 2/1928 | Great Britain. |
| 113,928 | 4/1945 | Sweden. |

DAVIS T. MOORHEAD, Primary Examiner